United States Patent
Kobayashi et al.

(10) Patent No.: US 11,088,421 B2
(45) Date of Patent: Aug. 10, 2021

(54) BATTERY PACK

(71) Applicant: HONDA MOTOR CO., LTD., Tokyo (JP)

(72) Inventors: Hiroto Kobayashi, Wako (JP); Keiichi Ito, Wako (JP); Akinori Shimomai, Wako (JP); Takuya Nishinuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/889,976

(22) Filed: Jun. 2, 2020

(65) Prior Publication Data

US 2020/0388816 A1 Dec. 10, 2020

(51) Int. Cl.
*H01M 50/502* (2021.01)
*H01M 50/20* (2021.01)
*H01R 25/14* (2006.01)

(52) U.S. Cl.
CPC ......... *H01M 50/502* (2021.01); *H01M 50/20* (2021.01); *H01R 25/145* (2013.01); *H01M 2220/20* (2013.01)

(58) Field of Classification Search
CPC ...... H01M 2/204; H01M 2/105; H01M 2/022; H01M 2/1077; H01M 2/206; H01M 50/20; H01M 50/502
See application file for complete search history.

(56) References Cited

U.S. PATENT DOCUMENTS

| 2014/0065461 A1* | 3/2014 | Kountz | C09K 21/14 |
| | | | 429/120 |
| 2016/0172642 A1* | 6/2016 | Hughes | H01M 2/1077 |
| | | | 429/90 |
| 2016/0372801 A1 | 12/2016 | Clemente et al. | |

FOREIGN PATENT DOCUMENTS

| EP | 3651236 | 5/2020 | |
| JP | 2011-216366 | 10/2011 | |
| JP | 2019-067558 | 4/2019 | |
| JP | 2019-067559 | 4/2019 | |
| JP | 2019-169337 | 10/2019 | |
| KR | 10-2019-0042341 | 4/2019 | |
| WO | WO-2020151046 A1 * | 7/2020 | ............ H01M 50/50 |

* cited by examiner

*Primary Examiner* — Jonathan G Jelsma

(74) *Attorney, Agent, or Firm* — Amin, Turocy & Watson, LLP

(57) ABSTRACT

A battery pack includes a first core pack and a second core pack each holding a plurality of unit cells. The unit cells of one of first cell groups (or second cell groups) in each of the first core pack and the second core pack are electrically connected to a connector through a positive-side connection busbar and a negative-side connection busbar, respectively. Vertically adjacent cell groups are electrically connected to each other through cell group interconnection busbars. Insulator is interposed between the mutually facing cell group interconnection busbars that present a largest potential difference.

2 Claims, 3 Drawing Sheets

BATTERY PACK

CROSS-REFERENCE TO RELATED APPLICATION

This application is based upon and claims the benefit of priority from Japanese Patent Application No. 2019-104146 filed on Jun. 4, 2019, the contents of which are incorporated herein by reference.

BACKGROUND OF THE INVENTION

Field of the Invention

The present invention relates to a battery pack including a plurality of core packs accommodated in a case.

Description of the Related Art

Battery packs are removably installed as a power source in various devices. As described in Japanese Laid-Open Patent Publication No. 2011-216366, this type of battery pack includes a core pack containing a plurality of unit cells and accommodated in the hollow interior of a case. The unit cells are aligned in a plurality of rows, for example, and the unit cells of a cell row (arbitrary row) are positioned such that their positive electrodes are directed in the same direction. Further, the unit cells of a cell row (adjacent row) adjoining that arbitrary cell row are positioned such that their positive electrodes are directed in the direction opposite to the direction in which the positive electrodes of the unit cells of that arbitrary row are directed.

Accordingly, the positive electrodes of the unit cells of that arbitrary row and the negative electrodes of the unit cells of that adjacent row are directed in the same direction. The positive electrodes and the negative electrodes are then electrically connected to each other through a busbar. That is, the unit cells of the arbitrary row and the unit cells of the adjacent row are electrically connected in series.

A connector is provided in the case, at the bottom thereof, for example, and the connector is engaged with a connector provided in an external device such as an electric vehicle etc. That is, the two connectors are electrically connected to each other. Then, the electric power from the battery pack is supplied to the external device through the two connectors.

SUMMARY OF THE INVENTION

A plurality of core packs may be accommodated in the case in order to provide larger discharge capacity and larger voltage. To realize this configuration, the cell rows of mutually facing core packs that are located most distant from the connector may be electrically connected to each other in series through a busbar (see FIG. 3). In this case, among all busbars, the busbar laid across the cell row closest to the positive terminal of the connector and the row adjacent to this row presents the highest potential. On the other hand, the busbar laid across the cell row closest to the negative terminal of the connector and the row adjacent thereto presents the lowest potential among all busbars. The lowest-potential busbar and the highest-potential busbar face each other in the case.

Now, although the battery pack itself is sealed, the lowest-potential busbar and the highest-potential busbar may be short circuited in case rain water or the like enters the battery pack. The possibility of occurrence of short circuit will be high especially when the potential difference between the two busbars is large.

A main object of the present invention is to provide a battery pack that can reduce short-circuit current between busbars as much as possible even when, for example, water enters the battery pack.

According to an embodiment of the present invention, provided is a battery pack including a case accommodating a plurality of unit cells each having a first electrode and a second electrode, and a connector to which the first electrodes and the second electrodes are electrically connected, the battery pack including:

a first core pack and a second core pack each configured to hold a plurality of the unit cells, the first core pack and the second core pack being accommodated in the case so as to face each other, wherein, in the first core pack and the second core pack, first cell groups are constituted by a plurality of the unit cells that are positioned in such a manner that the first electrodes thereof are directed in a same direction, and second cell groups are constituted by a plurality of the unit cells that are positioned in such a manner that the first electrodes thereof are directed in a direction opposite to the direction in which the first electrodes of the unit cells of the first cell groups are directed, the first cell groups and the second cell groups being arranged alternately;

a positive-side connection busbar configured to electrically connect a positive terminal of the connector and positive electrodes of the unit cells of one of the first cell groups or the second cell groups in the first core pack or the second core pack;

a negative-side connection busbar configured to electrically connect a negative terminal of the connector and negative electrodes of the unit cells of one of the first cell groups or the second cell groups in the second core pack or the first core pack;

cell group interconnection busbars each configured to electrically connect the unit cells of one of the first cell groups and the unit cells of one of the second cell groups in the first core pack or the second core pack; and a core pack interconnection busbar configured to electrically connect in series the unit cells of one of the first cell groups or the second cell groups that is located most downstream in a direction in which current flows in the first core pack, and the unit cells of one of the first cell groups or the second cell groups that is located most upstream in a direction in which the current flows in the second core pack, wherein, among the cell group interconnection busbars, a cell group interconnection busbar that electrically connects positive electrodes of the unit cells whose negative electrodes are electrically connected to the negative terminal through the negative-side connection busbar, to negative electrodes of the unit cells of an adjacent one of the second cell groups or the first cell groups, and a cell group interconnection busbar that electrically connects negative electrodes of the unit cells whose positive electrodes are electrically connected to the positive terminal through the positive-side connection busbar, to positive electrodes of the unit cells of an adjacent one of the second cell groups or the first cell groups, face each other, and an insulator is interposed at least between the two cell group interconnection busbars that face each other.

According to the present invention, among mutually facing cell group interconnection busbars, the insulator is interposed at least between the cell group interconnection busbar that electrically connects the positive electrodes of the unit cells whose negative electrodes are electrically connected to the negative terminal through the negative-side connection busbar, to the negative electrodes of the unit cells of the adjacent second cell group or first cell group, and the cell group interconnection busbar that electrically connects the negative electrodes of the unit cells whose positive electrodes are electrically connected to the positive terminal through the positive-side connection busbar, to the positive electrodes of the unit cells of the adjacent second cell group or first cell group.

Among all cell group interconnection busbars, one of the two cell group interconnection busbars mentioned above presents the lowest potential and the other presents the highest potential. That is, the potential difference between the two busbars is larger than the potential differences between other mutually facing cell group interconnection busbars in the case. A short circuit is more likely to occur and then a larger short-circuit current is more likely to flow between such busbars with a large potential difference, but, in the present invention, the insulator is interposed between the two busbars. It is therefore possible to avoid situations where a short-circuit current flows between the two busbars.

That is, even if water enters the case of the battery pack, a short circuit is unlikely to occur between the two busbars. Further, even if a short circuit occurs between any other mutually facing cell group interconnection busbars, the short-circuit current is sufficiently small because the potential difference between these cell group interconnection busbars is small as explained above. Accordingly, it is possible to suppress heat generation of the unit cells and hence of the battery pack.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The battery pack according to the present invention will be described below in detail referring to the accompanying drawings in conjunction with preferred embodiments.

Figure 1:
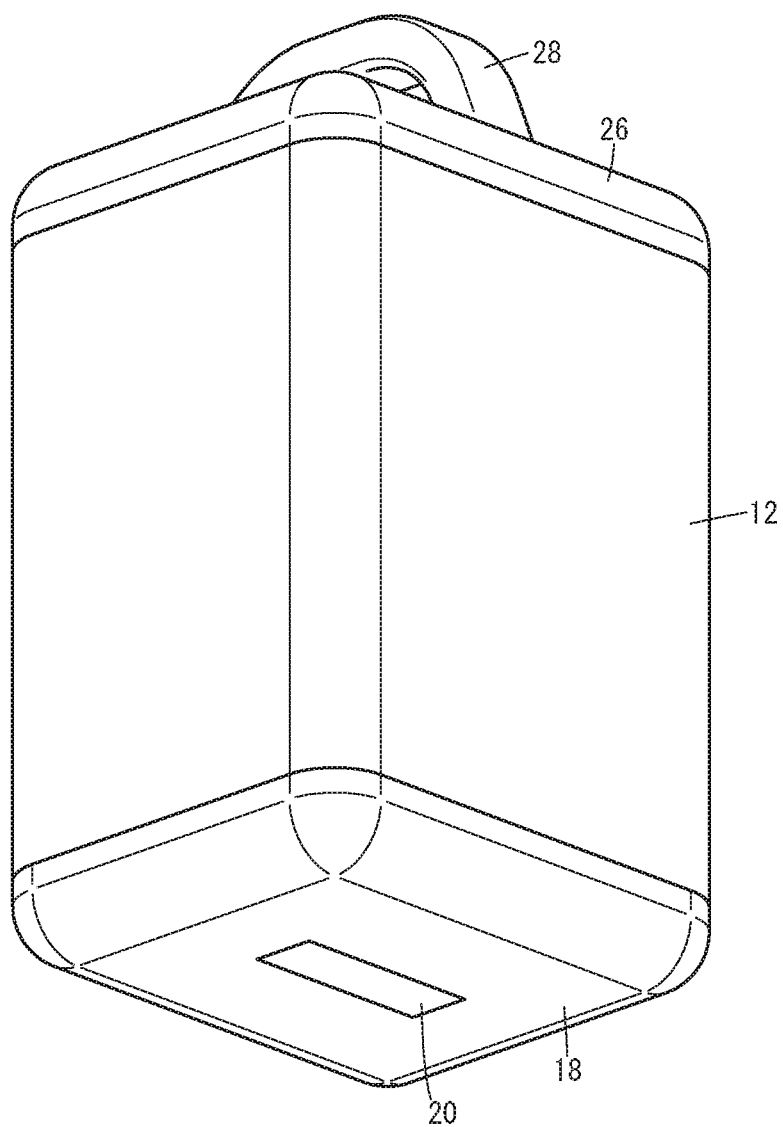
FIG. 1 is a schematic perspective view illustrating the entirety of a battery pack according to an embodiment of the present invention.
Figure 2:
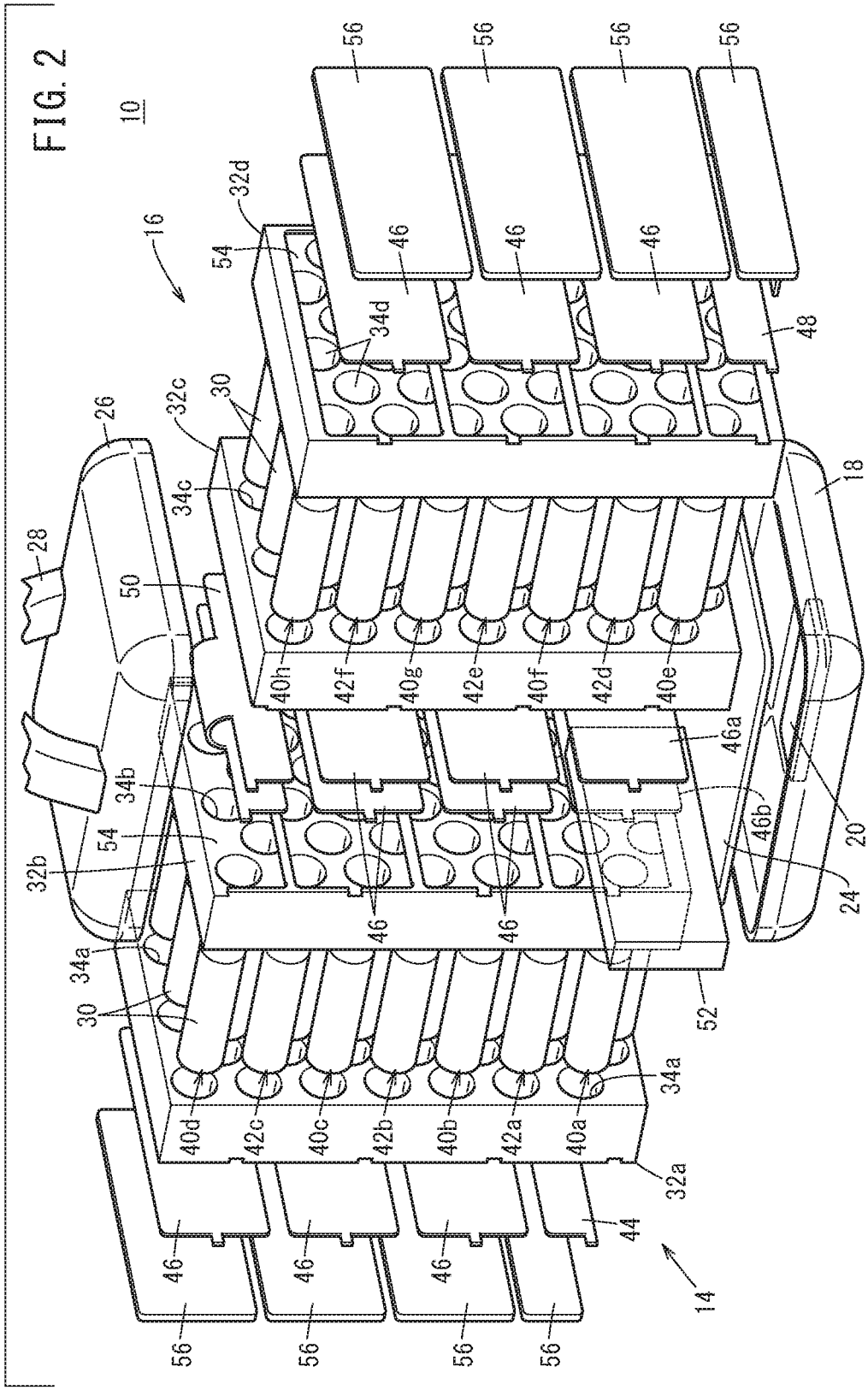
FIG. 2 is a schematic exploded perspective view of the battery pack of FIG. 1.
Figure 3:
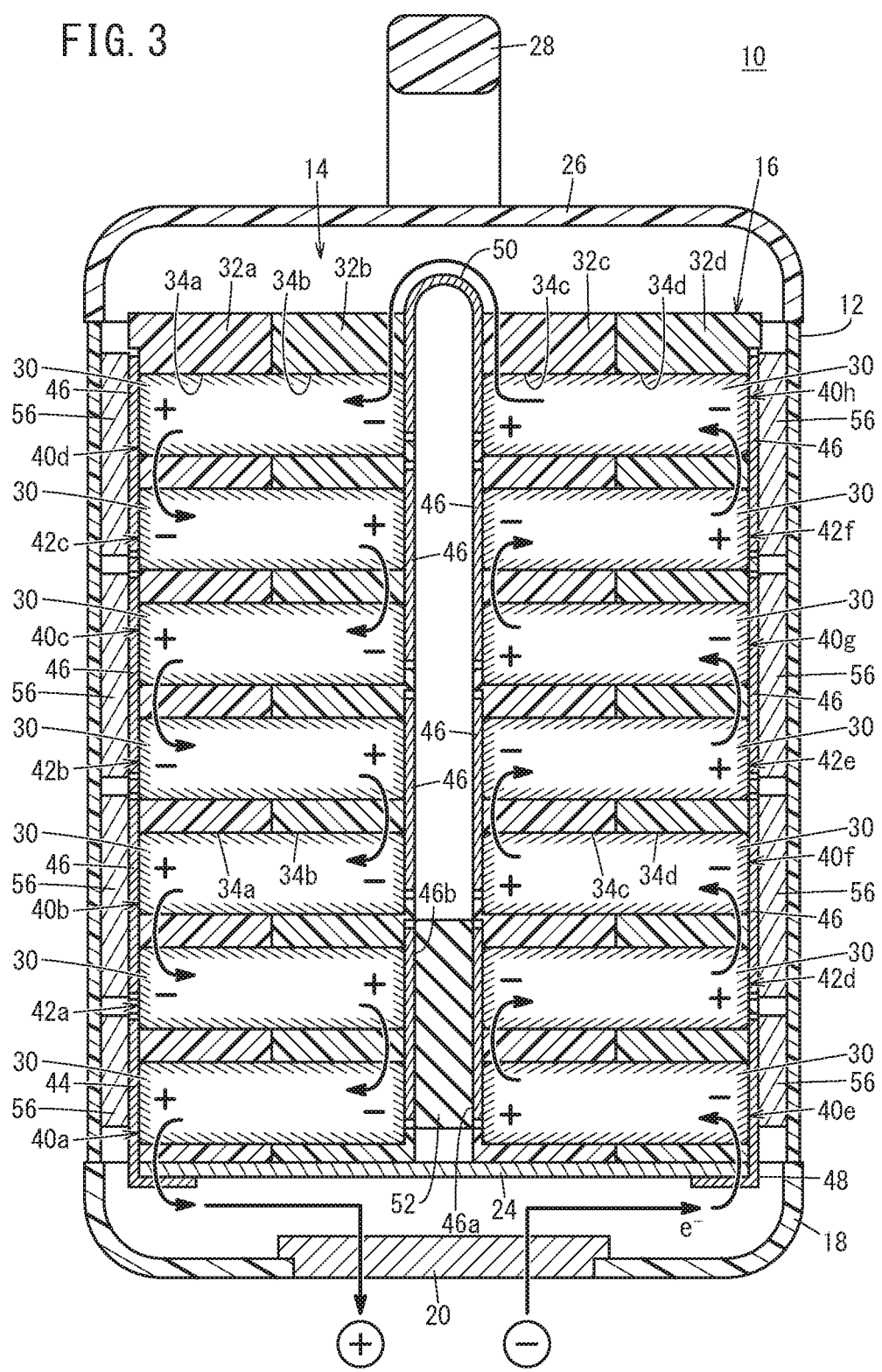
FIG. 3 is a schematic longitudinal cross section taken along a lengthwise direction of the battery pack of FIG. 1.

FIGS. 1 to 3 are a schematic perspective view showing the entirety of a battery pack 10 of this embodiment, a schematic exploded perspective view thereof, and a schematic longitudinal cross section taken along a lengthwise direction thereof, respectively. The battery pack 10 includes a case 12 formed like a hollow quadrangular prism having both its ends opened, and a first core pack 14 and a second core pack 16 accommodated in the hollow interior of the case 12. The case 12 is manufactured by extrusion molding of a material made of aluminum or aluminum alloy, for example. In this case, the case 12 can be robust and light in weight, and provides high thermal conductivity and hence superior heat transfer efficiency. Furthermore, the case 12 can be manufactured at low cost since the material is low priced.

The opening at the bottom of the case 12 is closed by a bottom case 18. A connector 20 is provided in the bottom of the bottom case 18, where the connector 20 extracts electric power from the first core pack 14 and the second core pack 16 in discharging operation and supplies electric power to the first core pack 14 and the second core pack 16 in charging operation. The connector 20 has a positive terminal and a negative terminal (neither of which is shown).

Further, a battery management unit (BMU) 24 is inserted between the bottom case 18, and the first core pack 14 and the second core pack 16, where the BMU 24 is a control unit for managing temperatures and voltages of the first core pack 14 and the second core pack 16. The BMU 24 serves also as a communication unit for performing communications with the external equipment (an electric vehicle etc.) and charger device.

On the other hand, the top opening of the case 12 is closed by a top case 26. A handle 28 shaped like an arch is formed on the top case 26, where the user can hold the handle 28 to lift up or carry the battery pack 10.

The first core pack 14 includes a plurality of unit cells 30 held in a first cell holder 32a and a second cell holder 32b. In this case, each unit cell 30 is shaped like a cylinder and has a positive electrode and a negative electrode provided at both ends of its axial direction. The positive electrode is a first electrode, for example, in which case the negative electrode is a second electrode having the polarity reverse of the positive electrode. Configuration of such unit cells 30 is well known and so the positive electrodes and negative electrodes will not be graphically shown nor described in detail herein.

A preferred example of the unit cells 30 can be lithium-ion secondary cells, but the unit cells 30 are not particularly limited thereto. Other preferred examples include nickel-hydrogen cells, nickel-cadmium cells, etc.

The first cell holder 32a and the second cell holder 32b have a plurality of storage holes 34a, 34b formed therethrough, respectively. The storage holes 34a, 34b are connected to each other as the first cell holder 32a and the second cell holder 32b are joined together. The diameter of the storage holes 34a, 34b corresponds to the diameter of the unit cells 30. The length of the connected storage holes 34a, 34b corresponds to the height of the unit cells 30. The unit cells 30 are arranged in such a manner that their lengthwise direction lies orthogonal to the lengthwise direction (top-bottom direction) of the battery pack 10. In this attitude, the unit cells 30 are individually inserted and held in the storage holes 34a, 34b.

The unit cells 30 inserted in the storage holes 34a, 34b are arranged in parallel with one another along a widthwise direction that is orthogonal to the lengthwise direction thereof. A row of multiple unit cells 30 arranged in the widthwise direction will hereinafter be referred to as a "cell group".

With the first cell holder 32a and the second cell holder 32b, the unit cells 30 of the lowermost cell group that is located closest to the connector 20 are positioned in such a manner that the negative electrodes thereof face the second core pack 16. Further, in the cell group that is located right above the lowermost one, the unit cells 30 are positioned in such a manner that the positive electrodes thereof face the second core pack 16. Now, the cell groups including unit cells 30 having negative electrodes facing the second core pack 16 will hereinafter be referred to as "first cell groups", and the cell groups including unit cells 30 having positive electrodes facing the second core pack 16 will hereinafter be referred to as "second cell groups".

The cell group located right above the lowermost second cell group is a first cell group, and the cell group located right above this first cell group is a second cell group. The first cell groups and the second cell groups are disposed alternately in this way. That is, in adjacent cell groups, electrodes with reverse polarities are directed in the same direction.

In this embodiment, the first core pack 14 includes four first cell groups and three second cell groups. In order that the cell groups can be identified easily, the first cell groups will hereinafter be labeled using reference numerals as 40a, 40b, 40c, 40d from bottom to top. Also, the second cell groups will be labeled as 42a, 42b, 42c from bottom to top. Note that hereinafter the wording "the positive electrodes (or negative electrodes) of a first cell group" means "the positive electrodes (or negative electrodes) of the unit cells 30 constituting the first cell group". Similarly, "the positive electrodes (or negative electrodes) of a second cell group" means "the positive electrodes (or negative electrodes) of the unit cells 30 constituting the second cell group".

The positive electrodes of the first cell group 40a that is the lowermost, or closest to the connector 20, are electrically connected to the positive terminal of the connector 20 through a positive-side connection busbar 44. The positive-side connection busbar 44 is disposed to face an inner wall of the case 12 and electrically parallel-connects the positive electrodes of the unit cells 30 forming the first cell group 40a.

The negative electrodes of the first cell group 40a and the positive electrodes of the second cell group 42a are electrically connected in series through a cell group interconnection busbar 46 laid across the adjacent cell groups. The cell group interconnection busbar 46 serves also to electrically parallel-connect the negative electrodes of the unit cells 30 forming the first cell group 40a, and the positive electrodes of the unit cells 30 forming the second cell group 42a.

In the same way, the negative electrodes of the second cell group 42a and the positive electrodes of the first cell group 40b, the negative electrodes of the first cell group 40b and the positive electrodes of the second cell group 42b, the negative electrodes of the second cell group 42b and the positive electrodes of the first cell group 40c, the negative electrodes of the first cell group 40c and the positive electrodes of the second cell group 42c, and the negative electrodes of the second cell group 42c and the positive electrodes of the first cell group 40d, are electrically connected in series respectively through cell group interconnection busbars 46. The cell group interconnection busbars 46, of course, each electrically connect the unit cells 30 of the same cell group in parallel.

Similarly, the second core pack 16 includes a plurality of unit cells 30 held in a third cell holder 32c and a fourth cell holder 32d. That is, the third cell holder 32c and fourth cell holder 32d have a plurality of storage holes 34c, 34d formed therethrough, respectively. The storage holes 34c, 34d are connected to each other as the third cell holder 32c and the fourth cell holder 32d are joined together. The unit cells 30 are positioned in such a manner that their lengthwise direction lies orthogonal to the lengthwise direction (top-bottom direction) of the battery pack 10. In this attitude, the unit cells 30 are individually inserted and held in the storage holes 34c, 34d.

Hereinafter, the cell groups in which the positive electrodes are directed in the same direction as the positive electrodes of the first cell groups 40a to 40d of the first core pack 14 will be referred to as "first cell groups", and the cell groups in which the negative electrodes are directed in the same direction as the negative electrodes of the second cell groups 42a to 42c of the first core pack 14 will be referred to as "second cell groups". Accordingly, in the second core pack 16, the positive electrodes of the unit cells 30 forming the first cell groups and the negative electrodes of the unit cells 30 forming the second cell groups face the first core pack 14.

In the second core pack 16, the lowermost cell group that is located closest to the connector 20 is a first cell group, and the one right above this first cell group is the lowermost second cell group. Also, the one right above this second cell group is a first cell group. That is, the first cell groups and the second cell groups are arranged alternately also in the second core pack 16. In this embodiment, the second core pack 16 includes four first cell groups and three second cell groups. In order that the cell groups can be identified easily, the first cell groups will hereinafter be labeled using reference numerals as 40e, 40f, 40g, 40h from bottom to top. Also, the second cell groups will be labeled as 42d, 42e, 42f from bottom to top.

The negative electrodes of the first cell group 40e that is the lowermost, or closest to the connector 20, are electrically connected to the negative terminal of the connector 20 through a negative-side connection busbar 48. The negative-side connection busbar 48 is disposed to face an inner wall of the case 12 and electrically parallel-connects the negative electrodes of the unit cells 30 forming the first cell group 40e.

Further, as in the first core pack 14, the positive electrodes of the first cell group 40e and the negative electrodes of the second cell group 42d, the positive electrodes of the second cell group 42d and the negative electrodes of the first cell group 40f, the positive electrodes of the first cell group 40f and the negative electrodes of the second cell group 42e, the positive electrodes of the second cell group 42e and the negative electrodes of the first cell group 40g, the positive electrodes of the first cell group 40g and the negative electrodes of the second cell group 42f, and the positive electrodes of the second cell group 42f and the negative electrodes of the first cell group 40h, are electrically connected in series respectively through cell group interconnection busbars 46. Furthermore, the cell group interconnection busbars 46 each also electrically connect the unit cells 30 forming the same cell group in parallel.

Further, the positive electrodes of the first cell group 40h located uppermost in the second core pack 16 are electrically series-connected to the negative electrodes of the first cell group 40d located uppermost in the first core pack 14, through a core pack interconnection busbar 50. That is, the core pack interconnection busbar 50 electrically connects the positive electrodes of the first cell group 40h that is most distant from the connector 20 and is located most downstream in the direction in which electrons move (most upstream in the direction in which current flows) in the second core pack 16, and the negative electrodes of the first cell group 40d that is most distant from the connector 20 and is located most upstream in the direction in which electrons move (most downstream in the direction in which current flows) in the first core pack 14.

The core pack interconnection busbar 50 electrically parallel-connects the positive electrodes of the unit cells 30 of the first cell group 40h, and the negative electrodes of the unit cells 30 of the first cell group 40d.

Comparing the potentials among all cell group interconnection busbars 46 in this configuration, the cell group interconnection busbar 46 that connects the first cell group 40e closest to the negative terminal of the connector 20 and the second cell group 42d right above the first cell group 40e presents the lowest potential, for the reason that will be explained later. On the other hand, the cell group interconnection busbar 46 that connects the first cell group 40a closest to the positive terminal of the connector 20 and the second cell group 42a right above the first cell group 40a presents the highest potential among all cell group interconnection busbars 46. Now, in order that these cell group interconnection busbars 46 can be easily distinguished from other cell group interconnection busbars 46, the cell group interconnection busbar 46 with the lowest potential will hereinafter be referred to as "lowest potential busbar 46a", and the cell group interconnection busbar 46 with the highest potential will be referred to as "highest potential busbar 46b".

As can be seen from FIG. 3, the lowest potential busbar 46a is disposed on the surface of the second core pack 16, the surface facing the first core pack 14. On the other hand, the highest potential busbar 46b is disposed on the surface of the first core pack 14, the surface facing the second core pack 16. That is, the lowest potential busbar 46a and the highest potential busbar 46b face each other.

Then, in this embodiment, an inert putty 52 as an insulator is interposed between the lowest potential busbar 46a and the highest potential busbar 46b. The inert putty 52 has been hardened, of course, and fills the clearance between the lowest potential busbar 46a and the highest potential busbar 46b.

The first to fourth cell holders 32a to 32d each have protruding walls to form a frame 54. The cell group interconnection busbars 46, most part of the positive-side connection busbar 44, and most part of the negative-side connection busbar 48 are fitted in the frames 54.

Heat dissipating sheets 56 are interposed as radiating members between inner walls of the case 12 and the cell group interconnection busbars 46 facing the case 12. Material that is sufficiently elastic and that can be kept compressed between the first cell holder 32a or fourth cell holder 32d and the inner wall of the case 12 is selected as a preferable material to form the heat dissipating sheets 56. This is because in this case the heat dissipating sheets 56 can be in close contact in large area with the first core pack 14 or second core pack 16 and the inner wall of the case 12.

The battery pack 10 according to this embodiment is configured basically as described above, and its functions and effects will be described next.

When installing the battery pack 10 in an external device such as an electric vehicle etc., the user holds the handle 28 and carries the battery pack 10 to that external device, and then installs the battery pack 10 into a battery installation unit of the external device, in such a manner that the connector 20 and the connector of the external device are electrically connected to each other. Since the connector 20 is disposed in the bottom of the bottom case 18 (see FIG. 1), the battery pack 10 is usually positioned such that its lengthwise direction lies along the direction of gravity, or such that its lengthwise direction is somewhat inclined relative to the direction of gravity. Then, electric power is supplied from the unit cells 30 in the case 12 to the external device when the starter switch of the external device is turned on. That is, the unit cells 30 discharge.

Here, vertically adjacent cell groups are electrically connected in series through the cell group interconnection busbars 46. Also, the negative electrodes of the first cell group 40e are connected to the negative terminal of the connector 20 through the negative-side connection busbar 48, and the positive electrodes of the first cell group 40a are connected to the positive terminal of the connector 20 through the positive-side connection busbar 44. Further, the positive electrodes of the first cell group 40h in the second core pack 16 and the negative electrodes of the first cell group 40d in the first core pack 14 are connected through the core pack interconnection busbar 50. Accordingly, electrons move through in order of: the negative terminal, the first cell group 40e, the second cell group 42d, the first cell group 40f, the second cell group 42e, the first cell group 40g, the second cell group 42f, the first cell group 40h, the first cell group 40d, the second cell group 42c, the first cell group 40c, the second cell group 42b, the first cell group 40b, the second cell group 42a, the first cell group 40a, and the positive terminal. Thus, among all cell group interconnection busbars 46, the potential is lowest at the cell group interconnection busbar 46 that connects the first cell group 40e closest to the negative terminal of the connector 20 and the second cell group 42d right above the first cell group 40e. That is, the cell group interconnection busbar 46 connecting the first cell group 40e and the second cell group 42d is the lowest potential busbar 46a.

On the other hand, the potential is highest at the cell group interconnection busbar 46 that connects the first cell group 40a closest to the positive terminal of the connector 20 and the second cell group 42a right above the first cell group 40a, among all cell group interconnection busbars 46. That is, the cell group interconnection busbar 46 connecting the first cell group 40a and the second cell group 42a is the highest potential busbar 46b. The potential difference between mutually facing cell group interconnection busbars 46 becomes smaller in the direction away from the connector 20.

With this configuration, if water enters the case 12 of the battery pack 10 from the battery installation unit, a short circuit may occur between the lowest potential busbar 46a and the highest potential busbar 46b. This is because the potential difference between the lowest potential busbar 46a and the highest potential busbar 46b is larger than the potential differences between other mutually facing cell group interconnection busbars 46, and also because these lowest potential busbar 46a and highest potential busbar 46b are closest to the bottom case 18, among the cell group interconnection busbars 46.

However, in the battery pack 10 of this embodiment, the inert putty 52 (insulator) is interposed between the lowest potential busbar 46a and the highest potential busbar 46b. This avoids situations where a short-circuit current flows between the lowest potential busbar 46a and the highest potential busbar 46b. That is, inserting the insulator between the lowest potential busbar 46a and the highest potential busbar 46b eliminates the fear that a short circuit might occur between the two busbars 46a and 46b.

The potential differences between the cell group interconnection busbars 46 disposed above the busbars 46a and 46b are not very large. Accordingly, even if a short-circuit current flows between the cell group interconnection busbars 46 between which the inert putty 52 is not interposed, the current value thereof is small. That is, the short-circuit current flowing through the unit cells 30 is sufficiently suppressed. The amount of heat generated by the unit cells 30 is therefore small. It is therefore possible to avoid excessive increase in the temperature of the unit cells 30 and hence of the battery pack 10.

In this way, the clearance between the lowest potential busbar 46a and the highest potential busbar 46b, where a large short-circuit current might flow, is filled with the inert putty 52, while no insulating treatment is applied to the clearances between the cell group interconnection busbars 46 where the potential difference is sufficiently small. This configuration avoids increasing the weight of the battery pack 10. In addition, this reduces the cost of the insulating treatment.

Moreover, the inert putty 52 is low priced and easily available, and offers superior sealing capability and is hence expected to check entering water. Furthermore, the inert putty 52 itself is physically and chemically stable to water. The short circuit preventing effect and sealing effect can therefore be sustained for a long period of time.

The present invention is not particularly limited to the embodiments described above but can be modified in various manners without departing from the essence and gist of the present invention.

For example, the negative electrodes of the unit cells 30 may be first electrodes and the positive electrodes thereof may be second electrodes.

The insulator is not particularly limited to the inert putty 52 but can be resin etc.

Insulator may be provided not only between the lowest potential busbar 46a and the highest potential busbar 46b where the potential difference is largest, but also in other portions where short circuit may possibly occur. Such a place can be the clearance between the cell group interconnection busbars 46, 46 with the next largest potential difference, i.e., between the cell group interconnection busbar 46 right above the lowest potential busbar 46a and the cell group interconnection busbar 46 right above the highest potential busbar 46b. Insulator may be provided between other cell group interconnection busbars 46, 46 where necessary.

What is claimed is:

1. A battery pack including: a case accommodating a plurality of unit cells each having a first electrode and a second electrode; and a connector to which the first electrodes and the second electrodes are electrically connected, the battery pack comprising:
    a first core pack and a second core pack each configured to hold a plurality of the unit cells, the first core pack and the second core pack being accommodated in the case so as to face each other, wherein, in the first core pack and the second core pack, first cell groups are constituted by a plurality of the unit cells that are positioned in such a manner that the first electrodes thereof are directed in a same direction, and second cell groups are constituted by a plurality of the unit cells that are positioned in such a manner that the first electrodes thereof are directed in a direction opposite to the direction in which the first electrodes of the unit cells of the first cell groups are directed, the first cell groups and the second cell groups being arranged alternately;
    a positive-side connection busbar configured to electrically connect a positive terminal of the connector and positive electrodes of the unit cells of one of the first cell groups or the second cell groups in the first core pack or the second core pack;
    a negative-side connection busbar configured to electrically connect a negative terminal of the connector and negative electrodes of the unit cells of one of the first cell groups or the second cell groups in the second core pack or the first core pack;
    cell group interconnection busbars each configured to electrically connect, in series, the unit cells of one of the first cell groups and the unit cells of one of the second cell groups in the first core pack or the second core pack; and
    a core pack interconnection busbar configured to electrically connect in series the unit cells of one of the first cell groups or the second cell groups that is located most downstream in a direction in which current flows in the first core pack, and the unit cells of one of the first cell groups or the second cell groups that is located most upstream in a direction in which the current flows in the second core pack,
    wherein,
    among the cell group interconnection busbars,
        a cell group interconnection busbar electrically connects positive electrodes of the unit cells whose negative electrodes are electrically connected to the negative terminal through the negative-side connection busbar, to negative electrodes of the unit cells of an adjacent one of the second cell groups or the first cell groups, whereby the cell group interconnection busbar becomes a lowest potential busbar of the cell group interconnection busbars, and
        a cell group interconnection busbar electrically connects negative electrodes of the unit cells whose positive electrodes are electrically connected to the positive terminal through the positive-side connection busbar, to positive electrodes of the unit cells of an adjacent one of the second cell groups or the first cell groups, whereby the cell group interconnection busbar becomes a highest potential busbar of the cell group interconnection busbars,
    the two cell group interconnection busbars face each other, and
    an insulator is interposed at least between the two cell group interconnection busbars that face each other.

2. The battery pack according to claim 1, wherein the insulator is an inert putty.

* * * * *